United States Patent
Park et al.

[11] Patent Number: 5,827,924
[45] Date of Patent: Oct. 27, 1998

[54] POLYMER SEALANT MICROENCAPSULATED BY POLYURETHANE REACTION AND ITS BINDER SOLUTION

[75] Inventors: In-Hwan Park; Kyung-Suck Min, both of Daejeon; Sang-Chul Park, Seoul, all of Rep. of Korea

[73] Assignee: Korea Research Institute of Chemical Technology, Rep. of Korea

[21] Appl. No.: 564,219

[22] PCT Filed: Jun. 16, 1994

[86] PCT No.: PCT/KR94/00073

§ 371 Date: Dec. 15, 1995

§ 102(e) Date: Dec. 15, 1995

[87] PCT Pub. No.: WO94/29603

PCT Pub. Date: Dec. 22, 1994

[30] Foreign Application Priority Data

Jun. 16, 1993 [KR] Rep. of Korea .................. 1993 10984
Jun. 16, 1993 [KR] Rep. of Korea .................. 1993 10985

[51] Int. Cl.$^6$ .............................. B32B 19/00; C08F 8/30; C08L 75/00; C08L 27/00
[52] U.S. Cl. .......................... 525/123; 411/258; 428/357; 428/402.21; 428/402.22; 428/402.2; 525/126; 525/127; 525/129; 525/440; 525/445; 525/451; 525/455; 523/201; 524/590
[58] Field of Search ............................. 411/258; 428/357, 428/402.21, 402.22, 402.2; 525/123, 126, 127, 129, 440, 445, 451, 455; 524/590; 523/201

[56] References Cited

U.S. PATENT DOCUMENTS

| | | | |
|---|---|---|---|
| 3,642,937 | 2/1972 | Deckert et al. | 260/834 |
| 3,746,068 | 7/1973 | Deckert et al. | 151/143 |
| 4,657,460 | 4/1987 | Bein | 411/258 |
| 5,000,636 | 3/1991 | Wallace | 411/258 |

FOREIGN PATENT DOCUMENTS

| | | |
|---|---|---|
| 63-109088 | 5/1988 | Japan . |
| 4-290539 | 10/1992 | Japan . |
| 1399316 | 5/1988 | U.S.S.R. . |

*Primary Examiner*—Patrick Niland
*Attorney, Agent, or Firm*—Finnegan, Henderson, Farabow, Garrett & Dunner L.L.P.

[57] ABSTRACT

This invention relates to polymer sealant microencapsulated by polyurethane reaction and its binder solution, particularly employing threaded mechanical fasteners such as bolt-nuts, screws, pipe joints and threaded nails, etc. The microcapsules are prepared by interfacial polyurethane reaction of triisocyanate with poly-functional alcohol under the aqueous oil-droplets solution containing vinyl monomers, oligomers, redox initiators and organic solvents together as core materials of the microcapsules. The binder solution of the microcapsules is prepared by dissolving chloroprene, polyester acrylate, urethane acrylate, carboxyl- or hydroxy-modified vinylchloride-vinylacetate copolymer, coinitiators and fillers in a mixture of tetrachloroethylene and toluene.

17 Claims, 3 Drawing Sheets

POLYMER SEALANT MICROENCAPSULATED BY POLYURETHANE REACTION AND ITS BINDER SOLUTION

BACKGROUND OF THE INVENTION

This invention relates to polymer sealant microencapsulated by polyurethane reaction and its binder solution, particularly employing threaded mechanical fasteners such as bolt-nuts, screws, pipe joints and threaded nails, etc.

In the assemblies of electronic products, automobiles and aircrafts, etc various kinds of bolt-nuts and screws are used as fastening means. But a fasten-locking system assembled by bolt-nuts or screws can be loosened by following reasons; The clearance between each of them is always present for their fastening and removing. Taking the screw surface of a bolt into a inclined plane in a little loosened bolt-nut system, the nut can gradually loose due to the sliding caused by its rotation or vibration, where the friction between them decreases with increasing of the clearance size.

Then, the more the fastening powers are increased, the more the sliding properties are decreased. But if there are some slidings between bolt-nuts, the loosenings caused by the properties can bring about when the fastening powers are applied to them. They also may be loosened by not only outside impact stress but also the shrinking/expanding of jointed polymer sealant or bolts and screws.

In order to prevent bolt-nuts or screws from loosening, some polymeric sealants are used, which play a role to restrain its rotation or vibration movement. Here, if the clearance between them is filled with the sealants, the sealants have adhesive function not to loosen its jointed parts.

In relation to this, U.S.S.R. SU Patent No. 1,399,316 (1988), a preparation method for microcapsules containing acrylic monomers, reactive acrylate oligomers and initiators, was uniquely disclosed. It was difficult to find out other reports for microcapsules prepared by using these kinds of components besides the patent.

Referring to this microcapsulated adhesive, Japanese Patent Kokai No. 63-109,088(1988), a microencapsulation containing a unreactive polymer solution, had a difficulty to get its products owing to the high viscosity formatted by organic phase in the course of the microencapsulation, and U.S. Pat. No. 3,642,937(1972), Japanese Patent Kokai No. 60-173(1985) and Japanese Patent Kokai No. 04-290,539 (1992), the microencapsulation by using other methods like a coacervation or its complicated one, also took a lot of time to get the products owing to its complicated process.

In order to prevent the various bolt-nuts and screws used in the assemblies of automobiles, electronic products and aircrafts, etc from loosening caused by outer impact, a liquid-typed anaerobic adhesive is generally used. The function of the adhesive is gained by fastening nuts after coating the adhesive on the bolts or screws, followed by its loss in the coarse of the coating of the adhesive. Thus, the adhesive is being gradually displaced by solid-typed one. The new adhesive on the surface of fastening parts is coated after blending of microcapsule-typed adhesive with its binder solution, followed by drying at 20°~40° C. The adhesive is none of loss, and the workability is also good.

SUMMARY OF THE INVENTION

The object of this invention is to get polymer sealant from microcapsules gained by a polyurethane reaction and its binder solution.

This invention relates to polymer sealant microencapsulated by interfacial polyurethane reaction of triisocyanate with polyfunctional alcohol under aqueous oil droplet phase containing vinyl monomers, oligomers, redox initiators and organic solvents together as core materials in a mixture of gelatin and arabic gum as surfactant.

Its binder solution is also prepared by blending 0.5~8 weight percent of chloroprene, 15~25 weight percent of polyester acrylate, 10~25 weight percent of urethane acrylate and 10~25 weight percent of carboxyl- or hydroxyl-modified vinylchloride-vinylacetate copolymer in 15.0~64.5 weight percent of a mixture of tetrachloroethylene and toluene, followed by adding a small amount of initiators, coupling agents and fillers.

DETAILED DESCRIPTION OF THE INVENTION

Figure 1:
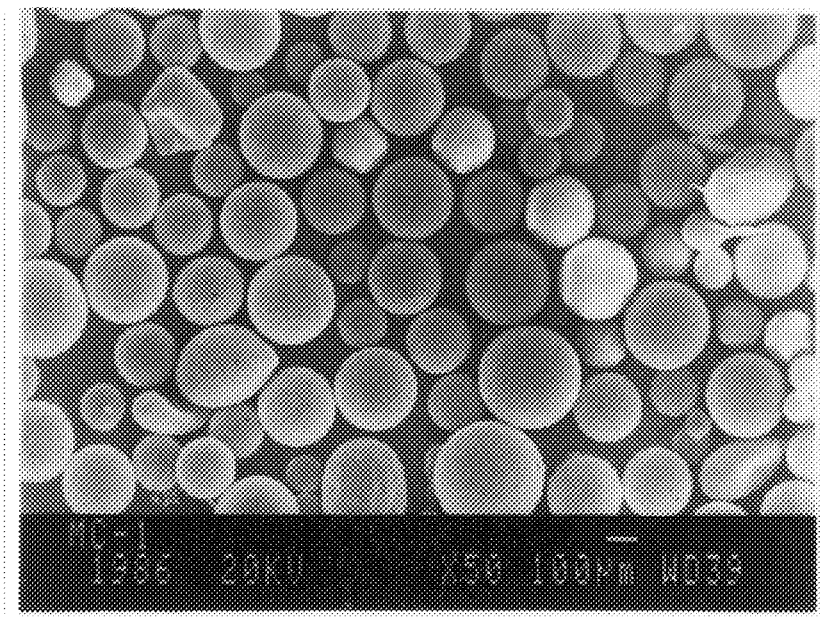
FIG. 1 is an electron photomicrograph of microcapsules (Tab. 1, example 2). Magnification: 50×.

The microcapsules are applicated for bolt-nuts or screws after blending with its binder solution. When they are fastened, the microcapsules contained in coating layer are broken by fastening pressure, and then the oil-phased adhesive components consisted in the core of the microcapsules are cured by redox catalysts. The catalyst system generally uses the combination of hydroperoxide and saccharin/aromatic amine.

As previously mentioned, the microencapsulated adhesive is used after coating and drying with its binder solution on the bolts or screws. During fastening them, various monomers and oligomers consisted in the adhesive are chemically cured, solidified by redox catalysts. On the other hand, the combination of rubber and its solvent is used to enhance the total adhesive force.

In this invention, the microcapsules containing organic oil-droplet phase, the adhesive components which can be polymerized, are gained as follows;

First of all, to two reactors with each condenser adhesive monomers, oligomers, the wall-forming material A(triisocyanate) in one side and a little organic solvents are blended for two kinds of microcapsules containing each of two kinds of initiators(reducer: A, oxidizer; B) together. To each of the two core materials added the aqueous solution which some surfactants are dissolved slowly. Each of the mixtures is stirred and dispersed to form homogeneous oil-droplets in two reactors in each. During agitation, the wall-forming material B(resorcinol or ethylene glycol) in another side is added to the aqueous oil-droplet phase slowly. As the result, two kinds of microcapsules containing each of two kinds of initiators are prepared by interfacial polymerization in each at the interface between the oil-droplets and the aqueous surfactant phase.

That is, oil-phased droplets containing monomers, redox initiators, the wall-forming material A in one side and some kinds of organic solvents are homogeneously mixed, and added to an excessive aqueous solution which some surfactants are homogeneously dissolved. The mixture is also stirred to form homogeneous oil-droplets, and during stirring, the other wall-forming material B is dropwisely added to the aqueous oil-droplet phase. Then, the wall of microcapsules is formed at the interface between the oil-droplets and the aqueous surfactant phase.

The interfacial polymerization between A and B the wall-forming materials of microcapsules, is sufficiently carried out to get good mechanical strength. After the aqueous reactant solution is filtered, microcapsules are obtained. Then, the microcapsules are curded due to the moisture and some organic solvents existed in their wall surfaces. In order to prevent the obtained microcapsules from curdling during purifying, the microcapsules are washed with alcohol or an aqueous alcohol solution, and freeze-dried or spray-dried to get separated microcapsules.

Monomers used in this invention are ethylene glycol dimethacrylate, diethelene glycol demethacrylate, triethylene glycol dimethacrylate, tetraethylene glycol dimethacrylate, trimethylolpropane trimethacrylate, styrene, chlorostyrene, vinyltoluene, α-methyl styrene, vinyl acetate and methylacrylate and ethylacrylate, etc. One or over two of these monomers can be used. These monomers are necessary for getting the adhesive force and mechanical strength when the final products are used as sealant adhesives, and they are used within 20~70 weight percent for the total amount of the oil-droplet phase used in the preparation of microcapsules.

And some organic solvents selected in this invention are toluene, xylene, methylethylketone, chloroform, and tetrachloroethylene, etc preferably a mixture of toluene and tetrachloroethylene. In this invention, a mixture of toluene and tetrachloroethylene are used. Tetrachloroethylene(sp. gr.: 1.620 at 20° C.) plays a role to increase the specific gravity of microcapsules. In order to apply the prepared microcapsules practically, the microcapsules are coated with a binder solution on bolts or screws, and dried. During drying, tetrachloroethylene prevents the microcapsules from floating the above binder solution.

Oxidizers used in this invention are t-butylhydroperoxide, cumenehydroperoxide(CHP), di-t-butylhydroperoxide, methylethylketoneperoxide, dicumylperoxide, 2,5-dimethylhexyldihydroperoxide, diisopropylbenzenehydroperoxide, t-butylperoxybenzoate and t-butylperoxyacetate, etc. They are used one or a mixture of two or more.

Reducers used in this invention are N,N'-dimethyl-p-toluidine(DMPT), phenyl-α-naphthylamine, N,N-dimethylaniline, triethylenetetramine, diethylenetriamine, and tri-N-buthylamine, etc. They are used one or a mixture of two or more.

Surfactants used in this invention are gelatin and arabic gum. They are used one or a mixture(gelatin: arabic gum= 1:3 wt. ratio) of two. The content of surfactants in an aqueous surfactant solution is used within 0.5~2.0 weight percent of the total amount of the used water. That is, the more the surfactant content or the stirring rate is increased, the more the sizes of microcapsules are minimized. If the content of surfactant is less than 0.5 weight percent, the sizes of microcapsules are largely formed, but if the content is more than 2.0 weight percent, the size-controlled microcapsules cannot be got due to high cohesive force among formed microcapsules. Also, the sizes of microcapsules can be restrictedly controlled by the stirring rate(300~400 rpm) of a reactor. In relation to this, the content of water is used within 2~8-fold weight ratio in proportion to the unit weight of the used organic oil-droplet phase. If the weight ratio of water to oil-droplet phase is less than 2, uniform aqueous oil-droplet phase cannot be obtained due to the low dispersion of solution. However, if the weight ratio of water to oil-droplet phase is more than 8, the productivity of microcapsules will be decreased.

To an aqueous oil-droplet phase existed in triisocyanate, polyfunctional alcohol such as ethylene glycol or resorcinol is slowly added in a reactive mol ratio of 1:1. As the result, the transparent ball-typed microcapsules are formed in the solution. Triisocyanate, one of the wall-forming materials in the preparation of microcapsules, is used in a concentration of 10~25 weight percent for the total amount of the used oil-droplet phase. If the content of triisocyanate is less than 10 weight percent, it is difficult to maintain the uniform shape of the microcapsules or to obtain the mechanical stability of wall due to the thin wall thickness of microcapsules. And if the content is more than 25 weight percent, the obtained microcapsules can't be used effectively because they are not broken due to the thick wall of microcapsules even though bolts are fastened very strongly by nuts. Then, the wall thickness of microcapsules can be controlled by increasing or decreasing the content of wall-forming materials.

The reactant solution is filtered, and washed with alcohol or an aqueous alcohol solution. The products is freezed- or spray-dried to get each of separated microcapsules containing monomers, initiators and organic solvents.

In this invention, a binder solution is necessary for coating microcapsules on bolts or screws. After coating and drying, it gives a binding function fixing the microcapsules on them. Then, the binder solution can be prepared as follows;

First of all, two kinds of anaerobic monomeric and oligomeric mixtures containing each of oxidizer or reducer are uniformly dissolved in each of same kinds of organic solvents, wherein the anaerobic monomer and oligomer may be selected from 2-hydroxyethylmethacrylate, 2-hydroxypropylmethacrylate, laurylmethacrylate, ethylene glycol dimethacrylate, diethylene glycol dimethacrylate, triethylene glycol dimethacrylate, tetraethylene glycol dimethacrylate, trimethylolpropane trimethacrylate, polyethylene glycol acrylate/its derivatives, polyester acrylate/its derivatives, and polyurethane acrylate/its derivatives. Toluene and tetrachloroethylene as organic solvents are also used.

And for increasing adhesive force of binder itself, carboxyl-modified vinyl chloride-vinylacetate copolymer (CVCVA), and/or hydroxyl-modified vinyl chloride-vinylacetate copolymer(HVCVA) are dissolved in the above organic solvents. If these resins are not used, the adhesive force is remarkably decreased because during fastening nuts on bolts or screws the binder resin on them is pushed out.

On the other hand, in order to increase the flexibility to adhesive, polyvinylidene fluoride/its elastomer, chlorinated polyethylene, polyester, polyvinylchloride, polyvinylacetate, polyurethane and polyacrylonitrile are used, which are partially dissolved in the organic solvents used as the core component of microcapsules.

Additionally, for improving the blending property of adhesive formulation and decreasing the tacky property of dried binder, a little coupling agents and fillers are used.

The more detailed process for preparing the binder solution in this invention may be illustrated as follows;

The basic solution is prepared by mixing 15~25 weight percent of polyester acrylate(PETA) and 10~25 weight percent of polyurethane acrylate(PUA) for the total amount of the used binder solution in a mixture(wt. ratio; 1:1) of toluene and tetrachloroethylene, where these kinds of acrylates are used to improve the adhesive force of polymer sealant. If the content of the acrylates are not within the above ranges, the adhesive force decreases due to the poor mechanical strength.

In order to increase the adhesive force additionally, carboxyl or hydroxyl-modified VCVA is used within 10~25 weight percent of the binder solution in this invention. And if necessary, polybutadiene-acrylonitrile copolymer (HYNBR) is also used within the range. Then, if the content of VCVA is less than 10 weight percent, the adhesive force decreases because the binder resin containing microcapsules coated on bolts or screws is pushed out during its fastening, but if the content of VCVA is more than 25 weight percent, the adhesive force also decreases because the content of reactive monomers and organic solvents existed in the microcapsules is relatively small.

In this invention, chloroprene rubber is dissolved, and used within 0.5~8 weight percent for the total amount of the used binder solution, which also plays a role to increase the adhesive force. If the rubber content is less than 0.5 weight percent, the adhesive force decreases in spite of the addition of the rubber, and if the content is more than 8 weight percent, the adhesive force also decreases due to the high flexibility caused by a lot of the rubber component.

Also, poly(methylmethacrylate)[PMMA] and/or poly(ethylene) powder(melt index: 4–6,: below 30 $\mu$ dia.) which can be diminished the tacky properties of polymer sealant can be added within 0.5~1.5 weight percent for the total amount of the used binder solution, and they play a role not only to control the viscosity of the binder solution, but also to enhance the mechanical property of adhesive sealant.

For improving the blending effect of organic-inorganic materials, one or over two of these coupling agents such as γ-aminopropyltriethoxysilane, γ-glycidyloxypropyltrimethoxysilane and vinyltris(2-methoxyethoxy)silane can be used within 0.2~1.2 weight percent for the total amount of the used binder solution.

Other reducers used as co-catalysts in the binder solution are o-benzoic sulfimide(SCC), acetyl thiourea, ethylene thiourea, 2-mercaptobenzothiazole, cobalt acetylacetonate (CoA) and cupric acetylacetonate(CuA), which can produce the synergistic effect by contacting amine-type reducers existed in microcapsules. One or over two of these kinds of reducers as co-catalysts can be used within 0.5~5 weight percent for the total amount of the used binder solution.

In the binder solution of this invention, a mixture of tetrachloroethylene and toluene as organic solvent is used within 15.0~64.5 weight percent for the total amount of the used binder solution. If the content of the organic solvent is less than 15.0 weight percent, the adhesive force is decreased, and if the content is more than 64.5 weight percent, the workability is reduced during the application on fasteners such as bolt-nuts and screws.

In order to apply the prepared microencapsulated adhesives practically, the microcapsules are blended with the binder solution obtained from the above method. The blended solution is coated on bolts or screws, and dried. Further features and advantages will be apparent from the following examples containing some Tables and Figures. The following examples illustrate the ways in which the principle of this invention has been applied, but are not to be construed as limiting its scope.

Example 1~2 (E1~E2) and Comparative Example 1~9 (CE1~CE9)

To reactors having reflux condenser and dropping funnel 1 l of 1.2 wt % aqueous surfactant(a mixture of gelatin and arabic gum in the weight ratio of 1:0.3) solution, the core materials of microcapsules such as 3.5 g of trimethylolpropane trimethacrylate, 15 g of α-methylstyrene, 5 g of vinyl toluene, 6 g of N,N'-dimethyl-p-toluidine (or 3.5 g of cumene hydroperoxide), 15 g of tetrachloroethylene, 5 g of toluene, 9 mmol(as calculated by the concentration of functional group, herein it is like) of diphenylmethane-4,4'-diisocyanate, 9 mmol of toluene-2,4-diisocyanate or 6 mmol of triisocyanate were added.

After the above solution was stirred at a speed of 350 rpm at 60° C. for 1 hour to get fine oil-droplets, 9 mmol of ethylene glycol or 9 mmol of resorcinol was slowly added using the dropping funnel.

As the result, the transparent ball-typed microcapsules were formed in the solution. The reactant solution was filtered, and washed with 500 volume percent of methyl alcohol for the total amount of the used solution. The products were freeze-dried to get each of separated microcapsules at −50° C. for 24 hours.

Figure 2:
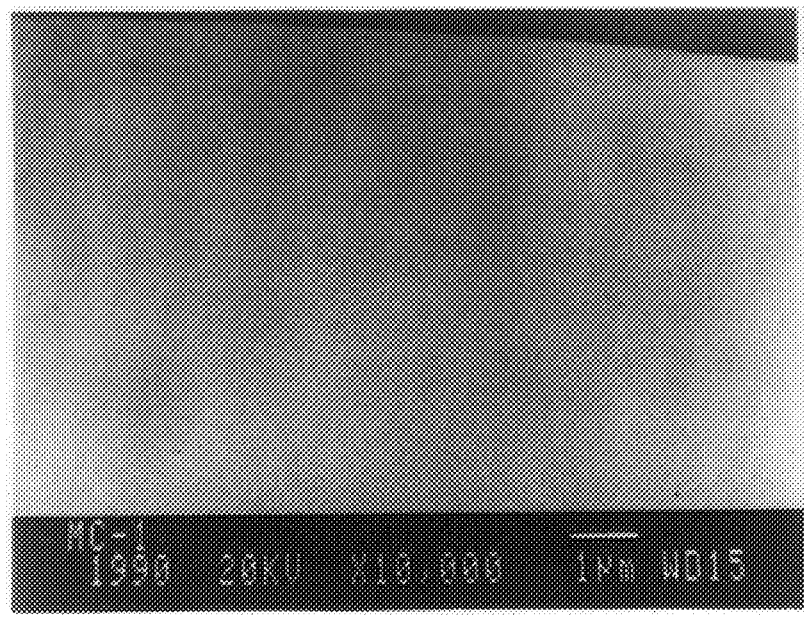
FIG. 2 is an enlarged electron photomicrograph of a microcapsule (Tab. 1, example 2) in FIG. 1. Magnification: 10,000×.
Figure 3:
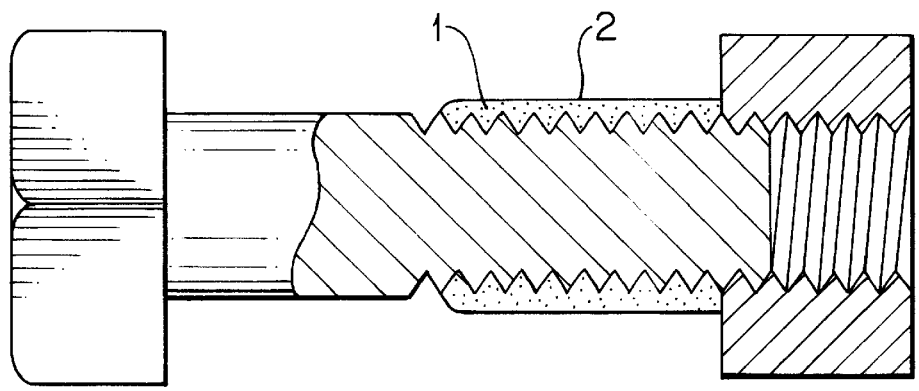
FIG. 3 shows a status of the microencapsulated anaerobic adhesive (Tab. 2, example 2) coated, dried by its binder on a bolt.
Figure 4A:
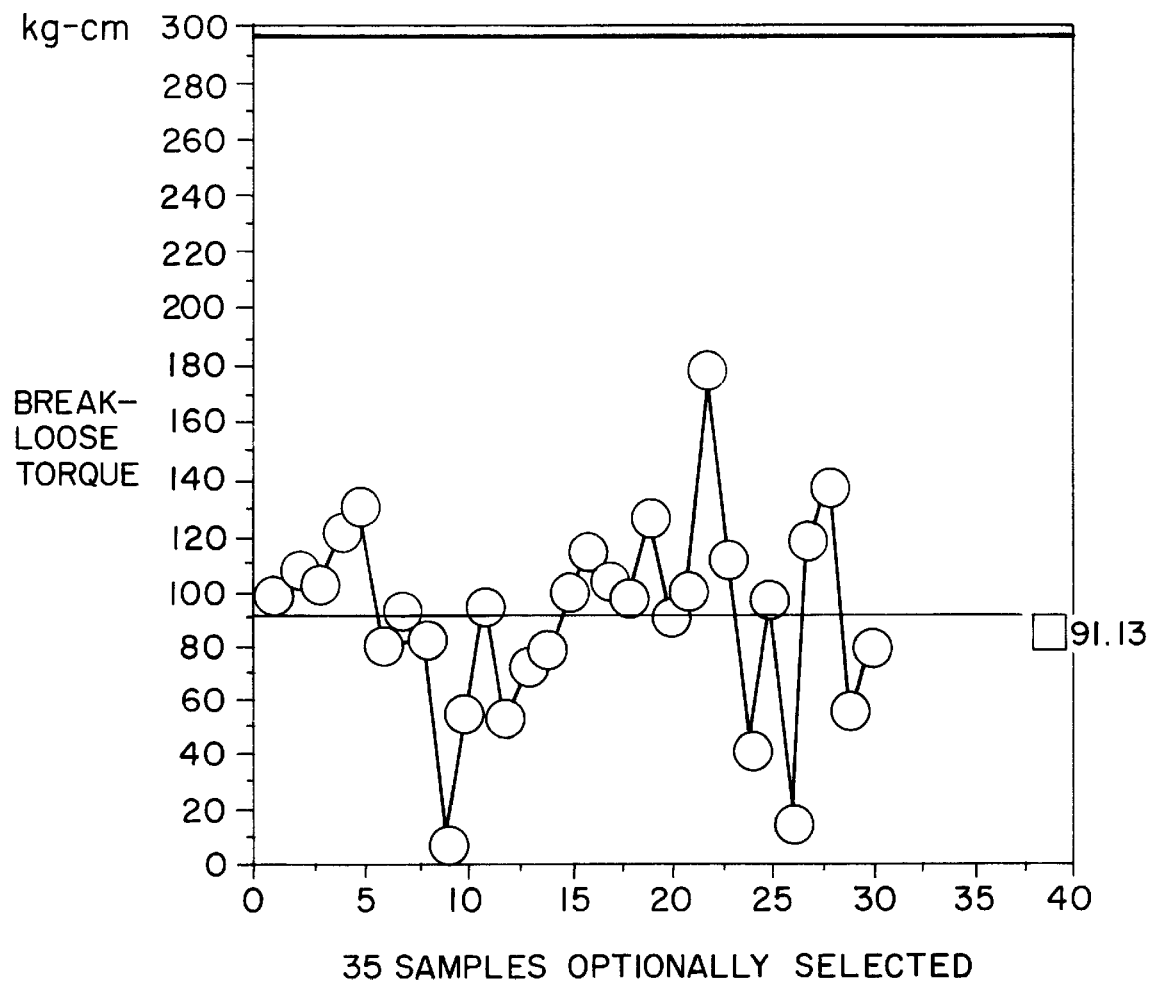
FIG. 4 shows adhesive forces (break-loose torque) after 24 hours based on the fastening of Zinc-galvanized bolt(⅜ in dia., 1.¼ in length)-nuts at 25° C.: (4a) Value obtained from example 2 of Tab. 2, (4b) Value obtained from goods of THREE BONDS Co., Japan.
Figure 4B:
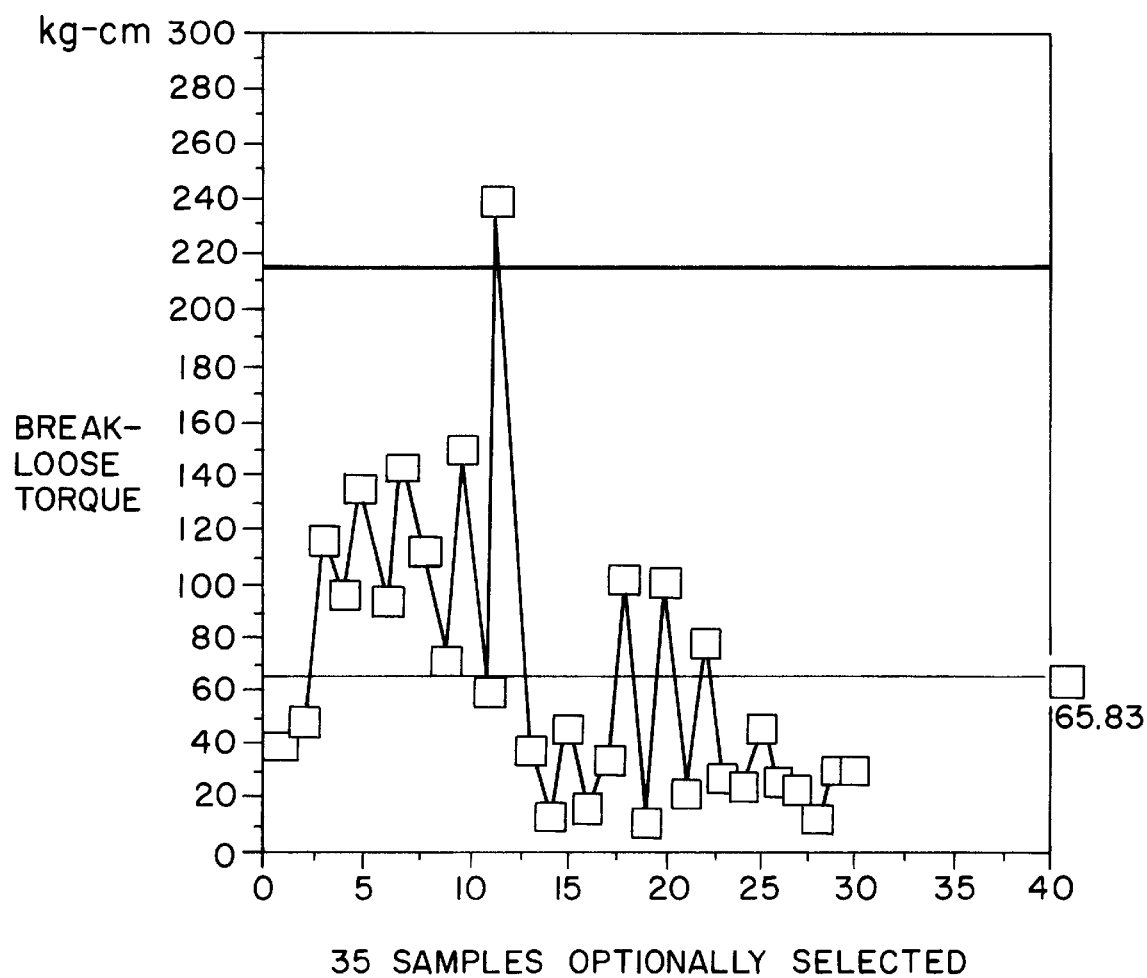

The electron microphotographs (50×, 10,000×) of microcapsules obtained by the above example 2 were shown in FIG. 1 and FIG. 2.

Comparative Example 10 (CE10)

To reactors having reflux condenser and dropping funnel 100 g of 10 wt % aqueous surfactant(a mixture of gelatin and arabic gum in the weight ratio of 1:1) solution. The 10 g of the core-materials composed by the above example 1 or 2 were added.

The above solution was stirred at a speed of 350 rpm at 40° C. for 6 hours to get stable oil-droplets. pH of the solution was adjusted to 4 by adding 10 wt % aqueous solution of acetic acid, followed by the coacervation at the interface between the core material and the aqueous solution. In addition, 1.6 g of glutaraldehyde and 0.4 g of formaldehyde as curing agent were slowly added to form the microcapsules.

As the result, the ball-typed microcapsules were formed in the solution. The reactant solution was filtered, and washed with 500 volume percent of methyl alcohol for the total amount of the used solution. The products were freeze-dried to get each of separated microcapsules at −50° C. for 24 hours. The experimental results were shown in Table 1.

Comparative Example 11 (CE11)

To a reactor of having reflux condenser and dropping funnel 100 g of 1.5 wt % aqueous arabic gum solution, 3 g of sebacoyl chloride or 2.5 g of terephtaloilchloride, the 10 g of other core materials composed by the above example 1 or 2 were added.

After the above solution was stirred at a speed of 350 rpm to get fine oil-drplets at 25° C. for 1 hour, 0.8 g of 1,6-hexamethylene diamine, 1 g of diethylene triamine or 1.1 g of tetraethylene pentamine were slowly added using the dropping funnel, and stirred.

As the result, the ball-typed microcapsules were formed in the solution. The reactant solution was filtered, and washed with 500 volume percent of methyl alcohol for the total amount of the used solution. The products were freeze-dried to get each of separated microcapsules at −50° C. for 24 hours. The experimental results were shown in Table 1.

TEST RESULTS

From the above comparative example 1~9, in the cases of using the various combination of MDI or/and TDI with ethylene glycol or resorcinol as the wall-forming materials, the microcapsules were too soft and weak to use as adhesives.

Also, from the above comparative example 10, the reaction for the preparation of microcapsules by using only gelatine as a surfactant took a long time relatively, and it was difficult to separate them from the aqueous solution after the reaction.

In addition, from the above comparative example 11, the reaction for the preparation of microcapsules using raw materials of diacid chloride and polyfunctional(di-, tri- or tetra-) amine brought about the porous wall-forming, followed by the outflow of core components outside the microcapsules.

Example 11~12 (B1~B2) and Comparative Example 12~21 (CB1~CB10)

In order to prepare the binder solution containing the microcapsules, to a mixer with a stirrer 100 g of a mixture of toluene and methylethylketone in weight ratio of 1:1 was added, and 20 g of polyester acrylate, 17 g of urethane acrylate, 10 g of VCVA and 0.8 g of HYNBR were uniformly dissolved in the mixture. Additionally, 6.5 g of PMMA, 1.5 g of vinyl tris(2-methoxyethoxy)silane, 8 g of acrylic acid, 40 g of talc, 0.01 g of p-benzoquinone, 0.08 g of CuA and 0.05 g of SCC were dissolved.

The binder solution in example 12(B2) was prepared by the same method in example 11(B1) except that 2.0 g of chloroprene was added.

The above microcapsules were sufficiently mixed with the prepared binder solution to obtain the desired adhesive, when the weight ratio of microcapsules to binder solution was 1:4. For the adhesion test the obtained final products as polymer sealant were coated on Zinc-gilted bolts(⅜ in dia, 1.14 in length), and dried at 25° C. for 24 hours. Nuts were also washed by methylene chloride. Then, some oils and dust on the surface of the nuts were removed. The bolt-nut was fastened at 25° C., and left to postcure at 25° C. for 24 hours. After that, the adhesion test was performed by using a torque wrench.

TEST RESULTS

As shown in Table 2, the binder solution in example 3 that didn't use chloroprene rubber gave us poor adhesion, while the binder solution in example 4 that used it gave us good adhesion owing to the physical adhesion caused by the mutual action between the organic solvent in microcapsules and chloroprene. And all the examples in Table 2 were also accompanied by the chemical adhesion due to the polymerization of monomers and oligomers using redox initiators.

As shown in Table 2, if the content of chloroprene used in examples was larger or smaller than that of example 12~13 (CB1~CB2), the adhesive force of the adhesive decreased. The adhesive force in example 21(CB10), even if chloroprene was used, was weak, for the force depended entirely on physical adhesion without chemical reaction. Also, The adhesive force of samples without redox initiators as shown in example 19~20(CB8~CB9) was weak and heterogeneous, because one kind of CHP or DMPT in its microencapsulation was used as a catalyst.

TABLE I

Preparation of microcapsules.

| Sample[a] | Wall-forming materials[b] | Surfactant[c] | Type[d] | Reaction Temp (°C.) | Time (hr) | Status of microcapsules |
|---|---|---|---|---|---|---|
| E 1 | TI/EG | G, A | I | 60 | 2 | good |
| E 2 | TI/RSNL | G, A | I | 60 | 2 | good |
| CE 1 | MDI/EG | A | I | 60 | 2 | weak wall-forming |
| CE 2 | MDI/GC | A | I | 60 | 2 | weak wall-forming |
| CE 3 | MDI/RSNL | A | I | 60 | 2 | weak wall-forming |
| CE 4 | TDI/EG | A | I | 60 | 2 | weak wall-forming |
| CE 5 | TDI/GC | A | I | 60 | 2 | weak wall-forming |
| CE 6 | TDI/RNSL | A | I | 60 | 2 | weak wall-forming |
| CE 7 | TI/GC | G, A | I | 60 | 2 | weak wall-forming |
| CE 8 | TI/EG | A | I | 60 | 2 | weak wall-forming |
| CE 9 | TI/RNSL | A | I | 60 | 2 | weak wall-forming |
| CE 10 | G/GA | A | S | 45 | 24 | poor wall-forming |
| CE 11 | TC/DET | A | I | 25 | 2 | porous wall-forming |

[a]E: Example, CE: Comparative Example
[b]TI: Triisocyanate, EG: ethylene glycol, RNSL: resorcinol, MDI: diphenylmethane-4,4'-diisocyanate; TDI: toluene-2,4-diisocyanate, GC: glycerol, TC: terephthaloyl chloride, DET: diethylene tetramine, GA: glutaraldehyde
[c]G: gelatin, A: arabic gum
[d]I: interfacial polymerization, S: Coacervation

TABLE 2

Adhesive force obtained from the combination of microcapsules [a] with its binder solution

| Sample[b] | Binder solution[c] | Adhesive type[d] | Break-loose torque (kg-cm) |
|---|---|---|---|
| B 1 | E 2 in Tab. 1 | C | 59 |
| B 2 | to B 1, CR added | C/P | 91 |
| CB 1 | to B 2, ⅓ fold of CR added | " | 71 |
| CB 2 | to B 2, 7 fold of CR added | " | 64 |
| CB 3 | B 2 not to use CoA | " | 51 |
| CB 4 | B 2 not to use CoA and SCC | " | 77 |
| CB 5 | B 2 not to use CVCVA | " | 54 |
| CB 6 | B 2 not to use PETA | " | 53 |

TABLE 2-continued

Adhesive force obtained from the combination of microcapsules [a] with its binder solution

| Sample[b] | Binder solution[c] | Adhesive type[d] | Break-loose torque (kg-cm) |
|---|---|---|---|
| CB 7 | B 2 not to use PUA | " | 51 |
| CB 8 | B 2 not to use DMPT | C/P | 41 |
| CB 9 | B 2 not to use CHP | C/P | 39 |
| CB 10 | B 2 not to use catalysts | P | 29 |

[a]Cured by the redox reaction of CHP with DMPT, SCC and CoA, etc.
[b]B: binder solution, CB: comparative binder solution
[c]CR: chloroprene, CVCVA: carboxyl-modified vinylchloride-vinylacetate copolymer, PETA: polyester acrylate, PUA: polyurethane acrylate
[d]C: chemical adhesion, P: physical adhesion

What is claimed is:

1. A microcapsule comprising a polymer sealant and a microcapsule wall, wherein the polymer sealant is microencapsulated by an interfacial polymerization reaction between a continuous aqueous surfactant phase and an aqueous oil-droplet phase,
   wherein the continuous aqueous surfactant phase comprises:
      a polyfunctional alcohol; and
      a surfactant, wherein the surfactant comprises a mixture of gelatin and arabic gum, and
   wherein the aqueous oil-droplet phase comprises vinyl monomers, oligomers, redox initiators, organic solvents, and triisocyanate.

2. A binder solution for coating the microcapsule according to claim 1 comprising:
   about 0.5–8 weight percent of chloroprene;
   about 15–25 weight percent of polyester acrylate;
   about 10–25 weight percent of urethane acrylate;
   about 10–25 weight percent of a polymer selected from the group consisting of carboxylated vinylchloride-vinylacetate copolymer and hydroxylated vinylchloride-vinylacetate copolymer; and
   about 15.0–64.5 weight percent of a mixture comprising tetrachloroethylene and toluene.

3. The microcapsule according to claim 1, wherein the interfacial polymerization produces polyurethane.

4. The binder solution according to claim 2, wherein the binder solution also comprises an initiator.

5. The binder solution according to claim 2, wherein the binder solution also comprises a coupling agent.

6. The binder solution according to claim 2, wherein the binder solution also comprises a filler.

7. The microcapsule according to claim 1, wherein the vinyl monomer is selected from the group consisting of ethylene glycol dimethacrylate, diethylene glycol dimethacrylate, triethylene glycol dimethacryate, tetraethylene glycol dimethacrylate, trimetholpropane trimethacryate, styrene, chlorostyrene, vinyl toluene, α-methyl styrene, vinyl acetate, methyl acrylate, and ethyl acrylate.

8. The microcapsule according to claim 1, wherein the aqueous oil-droplet phase comprises 20–70 weight percent of the vinyl monomer.

9. The microcapsule according to claim 1, wherein the organic solvent is selected from the group consisting of toluene, xylene, methylethylketone, chloroform, and tetrachloroethylene.

10. The microcapsule according to claim 9, wherein the organic solvent comprises a mixture of toluene and tetrachloroethylene.

11. The microcapsule according to claim 1, wherein the redox initiators comprise an oxidizer and a reducer.

12. The microcapsule according to claim 11, wherein the oxidizer is selected from the group consisting of t-butylhydroperoxide, cumenehydroperoxide, di-t-butylhydroperoxide, methylethylketoneperoxide, dicumylperoxide, 2,5-dimethylhexyldihydroperoxide, diisopropyl benzene hydroperoxide, t-butylperoxybenzoate, and t-butylperoxyacetate.

13. The microcapsule according to claim 11, wherein the reducer is selected from the group consisting of N,N-dimethyl-p-toluidine, phenyl-α-naphthylamine, N,N-dimethylaniline, triethylenetetramine, diethylenetriamine, tri-N-butylamine, σ-benzoic sulfimide, acetylthiourea, ethylene thiourea, and 2-mercaptobenzothiazole.

14. The microcapsule according to claim 1, wherein said triisocyanate is a product from the reaction of 2-ethyl-2-(hydroxymethyl)1,3-propanediol with toluene-2,4-diisocyanate.

15. The microcapsule according to claim 1, wherein said microcapsule comprises 0.5–2.0 weight percent surfactant based on weight of said aqueous oil-droplet phase.

16. The microcapsule according to claim 15 or, wherein said surfactant comprises a mixture of gelatin and arabic gum in the weight ratio of 1:3.

17. The microcapsule according to claim 1, wherein the microcapsule comprises between about 15–25 weight percent of microcapsule wall.

* * * * *

UNITED STATES PATENT AND TRADEMARK OFFICE
CERTIFICATE OF CORRECTION

PATENT NO. : 5,827,924
DATED : October 27, 1998
INVENTORS : Park et. al.

It is certified that error appears in the above-identified patent and that said Letters Patent is hereby corrected as shown below:

Claim 7, col. 10, line 6, "dimethacryate" should read --dimethacrylate--;
              line 7, "trimethacryate" should read --trimethacrylate--; and
Claim 16, col. 10, line 43, "15 or," should read --15 or 1,--.

Signed and Sealed this

Eighth Day of June, 1999

Attest:

Q. TODD DICKINSON

Attesting Officer     Acting Commissioner of Patents and Trademarks